United States Patent [19]

Sebald et al.

[11] Patent Number: 4,654,814
[45] Date of Patent: Mar. 31, 1987

[54] BIT/1 BIT DIGITAL CORRELATOR

[75] Inventors: Georg Sebald, Munich; Alfred Nist, Grafrath, both of Fed. Rep. of Germany

[73] Assignee: Siemens Aktiengesellschaft, Berlin and Munich, Fed. Rep. of Germany

[21] Appl. No.: 691,532

[22] Filed: Jan. 15, 1985

[30] Foreign Application Priority Data

Jan. 20, 1984 [DE] Fed. Rep. of Germany ....... 3401944

[51] Int. Cl.[4] .......................... G06G 7/12; G06J 7/00; G01R 23/16
[52] U.S. Cl. .................................... 364/604; 364/728; 364/819; 324/77 G
[58] Field of Search ............... 364/200, 900, 604, 715, 364/724, 725, 728, 733, 800, 807, 819, 820, 821, 822, 823, 824, 841; 324/77 E

[56] References Cited

U.S. PATENT DOCUMENTS

| | | | |
|---|---|---|---|
| 4,100,378 | 7/1978 | Claasen et al. | 364/728 X |
| 4,224,679 | 9/1980 | Nossen et al. | 364/728 |
| 4,288,857 | 9/1981 | Wilterding et al. | 364/728 |
| 4,346,475 | 8/1982 | Alexis | 364/604 |
| 4,547,864 | 10/1985 | Kawabata | 364/604 |
| 4,561,067 | 12/1985 | McKeown | 364/819 |
| 4,586,153 | 4/1986 | Hobrough | 364/604 |

FOREIGN PATENT DOCUMENTS 58-86314 11/1984 Japan .................... 364/604

*Primary Examiner*—Jerry Smith
*Assistant Examiner*—Jon D. Grossman
*Attorney, Agent, or Firm*—Hill, Van Santen, Steadman & Simpson

[57] ABSTRACT

A 1 bit/1 bit digital correlator includes a digital multiplier stage and an analog integrator stage, the analog integrator stage having a feedback loop for automatically adjusting a reference voltage for the integrator. The digital multiplier may be an exclusive OR gate which combines two incoming digital sequences and generates a digital output sequence which is divided into two paths in the integrator stage, one path being utilized for obtaining the reference voltage for the integrator and the other path forming a signal path for the integrator. The reference voltage path includes a switch operated by a refresh signal for selectively completing an RC network which is connected to the non-inverting input of an operational amplifier. The signal path includes a low-pass filter connected through a resistor to the inverting input of the operational amplifier, the operational amplifier having a capacitor connected across its output and its inverting input. A feedback loop for resetting the integrator stage is also connected between the output of the first operational amplifier and its inverting input and includes a second operational amplifier having an output selectively connectable through a further switch to the inverting input of the first operational amplifier, and having an inverting input to which a reference starting voltage is supplied and a non-inverting input connected to the output of the first operational amplifier.

7 Claims, 4 Drawing Figures

BIT/1 BIT DIGITAL CORRELATOR

BACKGROUND OF THE INVENTION

1. Field of the Invention

The present invention relates to a 1 bit/1 bit digital correlator with an independently adjustable integrator reference voltage.

2. Description of the Prior Art

Control loops are required in a number of circuits for demodulation, equalization and regeneration of a quadrature-amplitude-modulated digital signal. Acquisition of the setting voltage for the control elements in such conventional circuits is generally achieved by the use of a correlator which identifies the correlation of two digital bit sequences by means of an exclusive OR circuit and a following integrator stage, the setting voltage being derived from the output of the integrator stage. The performance capability of such demodulation, equalization and regeneration circuits greatly depends upon the precision of the setting voltages. In circuits having a relatively large number of correlators such as, for example, an adaptive basis equalizer, it is a problem in the art to provide a small, simple circuit which generates the setting voltage with optimally high precision, independently of signal scatter, temperature drift and aging characteristics of the components.

SUMMARY OF THE INVENTION

It is an object of the present invention to provide a digital correlator circuit which is small in structure and functions simply and precisely to provide a high-precision setting voltage for demodulation, equalization and regeneration circuits and the like.

The above object is inventively achieved in a correlator having a digital multiplier stage which supplies an input to a following analog-integrator stage. The digital multiplier stage is comprised of an exclusive OR gate in which two digital sequences are logically combined and the result of this combination is further combined with a divided clock pulse signal in a digital switch which is operated by a refresh signal. The output of the digital switch is supplied to a flip-flop having a clock input to which the non-divided clock pulse signal is supplied. The output of the flip-flop is supplied to the integrator stage wherein it is divided into a signal path and a reference voltage path.

In the reference voltage path, a reference voltage signal for the integrator is generated by another switch is also operated by the refresh signal, the further switch being interconnected between a series capacitor and a shunt resistor, the node between the resistor and capacitor being connected to the non-inverting input of a first operational amplifier.

The signal path includes a low-pass filter formed by a resistor and a capacitor, the low-pass filter being connected through another resistor to the inverting input of the first operational amplifier. A capacitor is connected across the output of the first operational amplifier and its inverting input.

The first operational amplifier also has a feedback loop connected between its output and its non-inverting input for the purpose of resetting the integrator stage. The feedback loop includes a second operational amplifier having a non-inverting input connected to the output of the first operational amplifier, and an inverting or setting input to which a selected setting voltage is supplied. The output of the second operational amplifier is supplied to the inverting input of the first operational amplifier through a resistor and another switch which is closed at selected times by a control signal.

DESCRIPTION OF THE PREFERRED EMBODIMENTS

Figure 1:
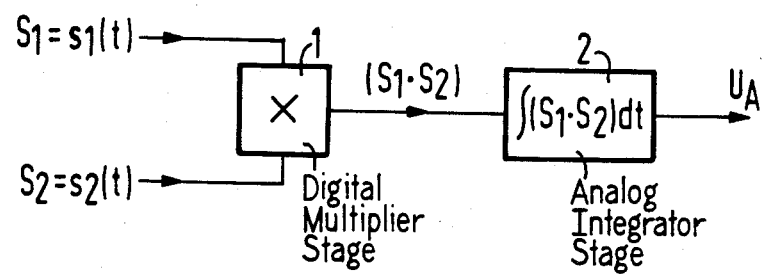
FIG. 1 is a schematic block diagram of a correlator constructed in accordance with the principles of the present invention.

A correlator constructed in accordance with the principles of the present invention is schematically shown in FIG. 1 consisting of two basic units, namely a digital multiplier stage 1 and an analog integrator stage 2. Signals $S_1 = s_1(t)$ and $S_2 = s_2(t)$ are supplied to the multiplier stage 1 and the product $(S_1.S_2)$ is formed. If a dependency of the two signal curves on each other exists, the following integrator stage 2 will supply an output voltage $U_A$ which differs from a selected starting voltage. If no correlation between the incoming signals exists, the product at the output of the multiplier stage 1 is just as frequently positive as negative, and the output voltage of the integrator stage 2 will fluctuate around the starting voltage. If the output voltage $U_A$ is supplied to a further circuit or circuit component which can influence $S_1$ and/or $S_2$, a control loop is created having the object of cancelling any correlation between the signals $S_1$ and $S_2$.

Figure 2:
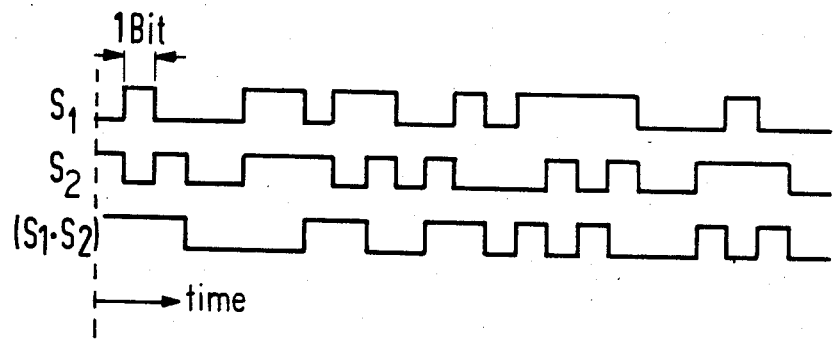
FIG. 2 is a voltage/time diagram showing various pulse sequences of the circuit shown in FIG. 1.

In the embodiment shown in the drawings, the signal $S_1$ and $S_2$ are, as shown in FIG. 2, binary pulse sequences which are multiplied modulo 2 in the multiplier stage 1, which is an exclusive OR circuit.

If the bit sequences $S_1$ and $S_2$ are not correlated and are thus, for example, true random sequences, the output of the exclusive OR circuit will again be a random sequence having the same frequency in the appearance of log 1 and log 0. If any type of relationship whatsoever exists between the informational units of the signals $S_1$ and $S_2$, the 0/1 frequency ratio in the product will change. Given equiphase correlation, more zeros than ones will appear; the inverse occurs given anti-phase correlation. Such a product forwarded to the integrator stage 2 will cause the integrator stage to run away in one direction given a 0/1 ratio which differs from 50%. It is preferable that the integration result be provided as an analog voltage for controlling a servo-component in a control loop (not shown) for eliminating correlation between $S_1$ and $S_2$.

Figure 3:
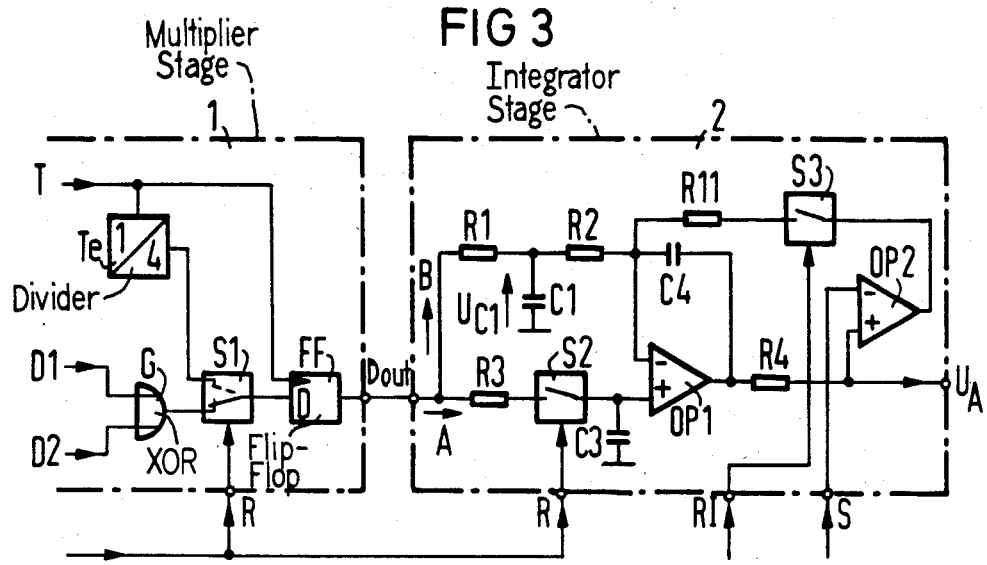
FIG. 3 is a detailed circuit diagram of the correlator constructed in accordance with the principles of the present invention shown in FIG. 1.

Further details of the 1 bit/1bit correlator of FIG. 1 are shown in FIG. 3, the components being grouped as part of the digital multiplier stage 1 and the analog integrator stage 2 shown in dot-dash lines.

The digital portion of the correlator, which may be contained on a chip, has inputs for a clock signal T, digital input signals D1 and D2, and a refresh signal R. The refresh cycles are selected such that $t_{out}$ is much greater than $t_{in}$, for example, $t_{out} = 20$ ms and $t_{in} = 0.5$ ms. The output of the digital stage is designated $D_{out}$, and is supplied as the input to the integrator stage 2.

The two digital sequences D1 and D2 are logically combined (modulo 2 multiplication) in an exclusive OR gate G. The bits enter with the frequency of the clock signal T. A periodic 1100 sequence is obtained by a 4:1 division of the clock signal T in a divider Te. This divided clock sequence is combined with or faded into the multiplication product at specific intervals by means of a digital switch S1 which is switched by the refresh signal R. The output of the switch S1 is sampled by the clock signal T in a flip-flop FF having a clock input to which the signal T is supplied, and another input D connected to the output of the switch S1. The output of the flip-flop FF is the output $D_{out}$ for the digital multiplier stage 1. At the output of the flip FF, a distinction can no longer be made between bits derived from the reference sequence and from the product. The electrical signal curves are identical.

Figure 4:
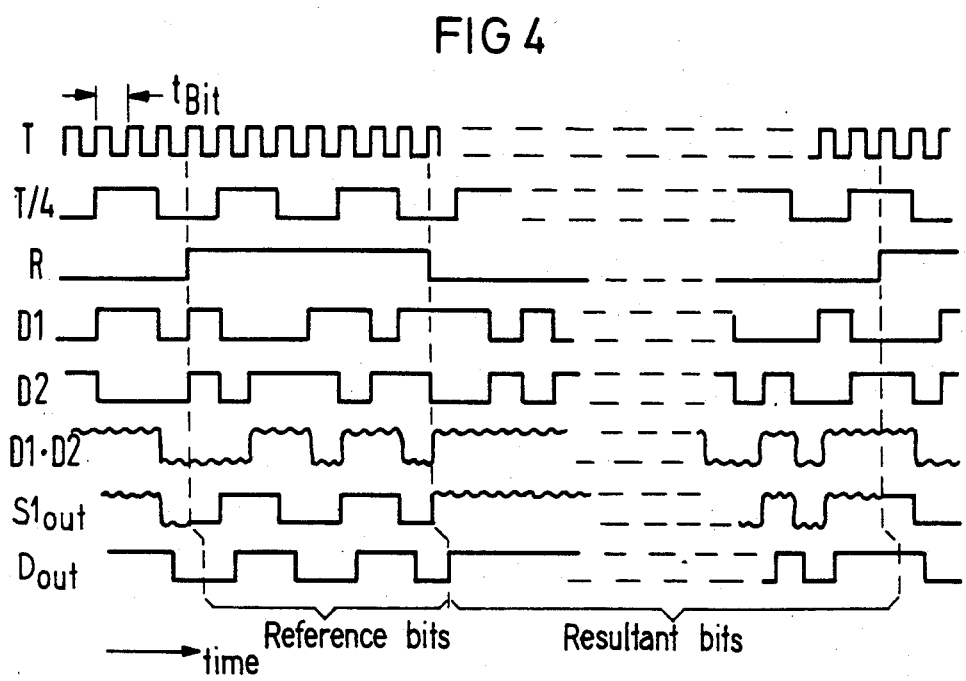
FIG. 4 is a voltage/time diagram of various pulse sequences for explaining the operation of the circuit shown in FIG. 3.

Various pulse sequences for explaining the operation of FIG. 3 are shown in FIG. 4, including the clock signal T, the divided clock signal T/4, the refresh signal R, the digital sequences D1 and D2, the product D1 . D2, the output S1$_{out}$ of the switch S1, and the digital stage output $D_{out}$. In order to illustrate the effect of the sampling flip-flop FF, a superimposed noise voltage is shown for the signal D1 . D2, this noise voltage no longer being present at the output of the flip-flop FF. In order to simplify the drawing, a refresh signal R having only 8 bits length is shown, however, in practice this length will be several thousand bits.

The bit sequence supplied during the refresh phase serves to generate the integrator 0 reference voltage. This sequence should have the same DC voltage mean value as a random sequence having a 50% 1/0 ratio. This is achieved by a reference bit sequence (. . . 11001100 . . .) having the features of identical frequency of 1 and 0, identical frequency of positive and negative edges as the random sequence defined above, identical electrical levels for log 1 and log 0 in the result bits and in the reference bits, and identical edge steepness and delay times in the reference and result bits.

The analog integrator stage 2 may be realized as a hybrid module and has an input for receiving $D_{out}$ from the digital stage, an input R for the refresh signal, and inputs S and RI for setting the integrator starting voltage and for resetting the integrator as described in greater detail below. The analog integrator stage 2 has an output $U_A$ which corresponds to the integration value. The incoming digital signal is divided in the integrator stage 2 into two paths A and B. Path A, which serves for generating the integrator 0 reference voltage, includes a bi-directional CMOS switch S2 and an RC network comprised of a series resistor R3 and a shunt capacitor C3. The path A is connected to the non-inverting input of an operational amplifier OP1. Operation of the switch S2 by the refresh signal R results in a periodic blocking of the reference bit sequence in front of the amplifier OP1. The holding capacitor C3 sets itself to the mean value voltage of only the reference sequence, and not of the result bit sequence. The switch S2 is closed during the refresh phase. The DC mean value of the reference sequence is formed by the RC network. After conclusion of the refresh phase, the switch S2 is again opened so that the mean value voltage across the capacitor C3 is maintained or stored. For this purpose, the capacitor C3 cannot be permitted to discharge between two refresh cycles. This is insured by utilizing a switch as the switch S2 which has a very high inverse resistance (this being achieved by designing the switch S2 as a bi-directional CMOS switch) and by selecting an operational amplifier OP1 which has a very high impedance. Moreover, the capacitor C3 is selected to have a low self-discharge capacity.

During the next reference phase, the mean voltage at the capacitor C3 is merely augmented in case the voltage across the capacitor C3 had not yet reached its final value during the cutin operation of the preceding refresh phases, in case the physical properties of the digital signal have changed due, for example, to thermal effects, or in case the charge of the capacitor C3 may have changed due to other effects (for example, self-discharge).

With high precision, the voltage across the capacitor C3 thus represents that voltage which contains a binary random sequence with 50% 1/0 distribution as its DC mean voltage value.

Path B serves as the actual signal path for the integrator. The digital signal $D_{out}$ first proceeds through a low-pass filter formed by a resistor R1 and a capacitor C1. The low-pass filter cuts off the high frequency components of the digital signal and also filters out only the DC voltage mean value of the digital signal. A following resistor R2 is connected to a tap of the low-pass filter between R1 and C1, and the inverting input of the operational amplifier OP1. The resistor R2 is thus at virtual ground and the low-pass filter is permanently loaded at its output by means of the resistor R2. The low-pass filter has a limit frequency $\omega_g = C_1(R1.R2)/(R1+R2)$.

If the resistor R2 is selected to be larger than R1 by a factor greater than 10, the resistor R2 has negligible effect on the limit frequency $\omega_g$.

The actual integration occurs through an RC combination comprised of the resistor R2 and a capacitor C4 interconnected between the output and the inverting input of the operational amplifier OP1 and the operational amplifier OP1 itself. The output voltage of the integrator is $$U_A = 1/(R2 \cdot C4) \int_0^t U_{C1}(t) \, dt.$$

The voltage $U_{C1}$ is the voltage across the capacitor C1, and is already filtered, therefore an operational amplifier having a relatively small band width suffices. It is important that the mean value of $U_{C1}$ is integrated up, i.e., fluctuations from the 50% 1/0 ratio in the digital signal $D_{out}$, which are already optimally small, are integrated.

The refresh command, which causes only the reference bit sequence to be connected to the integrator, affords the possibility of retaining the integration value, i.e., a specific integrator output voltage. This voltage can be advantageously utilized when it is desired to blank out the result bits of the modulo two multiplications in specific time windows such as, for example, when those signals in the time windows contain only noise information for the correlation.

The operational amplifier OP1 is provided with a feedback loop which includes a second operational amplifier OP2 having a non-inverting input connected to the output of the first operational amplifier OP1 through a resistor R4, and a setting or inverting input to which a selected starting voltage S is supplied. The output of the operational amplifier OP2 is connected through a bi-directional switch S3 and a resistor R11 to the inverting input of the first operational amplifier OP1. The switch S3 is controlled by a control signal RI. The feedback loop serves for resetting the integrator stage and operates as explained below.

At the beginning of the integration time, the output voltage of the integrator stage must be set to a specific DC value. A selected starting voltage S is supplied to the inverting input of the second operational amplifier OP2. The operational amplifier OP2 functions as a comparator. The switch S3 is closed during the setting operation. Feedback from the output of the amplifier OP2 to the inverting input of the amplifier OP1 ensues through the resistor R11. The output voltage $U_A$ is adjusted until it coincides with the setting voltage S. This feedback loop can be dimensioned to compensate for the fact that a noise signal (which is similarly leveled) arrives at the amplifier OP1 through the low-pass filter. At the end of the setting operation, the switch S3 is opened by a further change of state of the control signal RI, and the starting voltage S will be across the integration capacitor C4. The integration operation then begins.

The circuit described above achieves an integration result, without balancing elements, which is independent of signal scatter, temperature drift, and aging phenomena of the components. Moreover, the integration result is independent within wide limits of the tolerances of the electrical characteristics of the components. Additionally, the circuit occupies a very small space on a chip, is highly temperature-stable, and exhibits a high precision for the integrator 0 reference voltage.

Although modifications and changes may be suggested by those skilled in the art it is the intention of the inventors to embody within the patent warranted hereon all changes and modifications as reasonably and properly come within the scope of their contribution to the art.

We claim as our invention:

1. A 1 bit/1 bit digital correlator for use with two digital bit input sequences, a digital clock pulse signal, a digital refresh signal, a digital control signal and a voltage setting signal, and having a digital multiplier stage connected to an analog integrator stage, said digital multiplier stage comprising:
   an exclusive or gate having respective inputs to which said two input sequences are supplied for logically combining said input sequences and generating a product sequence;
   a divider to which said clock pulse signal is supplied for dividing the frequency thereof and generating a divided clock pulse signal;
   a first digital switch operated by said refresh signal for connecting said divided clock pulse signal for a selected reference period to an output of said first switch and otherwise connecting said product sequence to the output of said first switch; and
   a flip-flop having an input connected to the output of said first switch and a clock input to which said clock pulse signal is supplied, said flip-flop having an output forming an output for said digital multiplier stage,
and said analog integrator stage comprising:
   a first operational amplifier having an inverting input connected to a signal path and a non-inverting input connected to a reference path and having an output, said signal and reference paths both being connected to the output of said digital multiplier stage;
   said reference path including a reference resistor connected in series with a second digital switch operated by said refresh signal and having an output connected to said non-inverting input of said first operational amplifier and to a shunt capacitor, said shunt capacitor developing a voltage equal to the DC mean voltage of a random digital bit sequence having a 50% high level/low level ratio as a reference signal for said first operational amplifier when said first and second switches are closed by said refresh signal;
   said signal path including a low-pass filter having an output tap connected through an integrating resistor to said inverting input of said first operational amplifier;
   an integrating capacitor connected between the output and the inverting input of said first operational amplifier; and
   a feedback loop connected between said output and said inverting input of said operational amplifier for resetting said integrator stage, said feedback loop including a second operational amplifier having a signal input connected to the output of said first operational amplifier, a setting input to which said voltage setting signal is supplied, and an output connected to said inverting input of said first operational amplifier through a third digital switch operated by said control signal and a feedback resistor, said control signal closing said third switch for a selected period for setting said integrator stage.

2. A correlator as claimed in claim 1, wherein said second switch has a high inverse resistance.

3. A correlator as claimed in claim 2, wherein said second switch is a bi-directional CMOS switch.

4. A correlator as claimed in claim 1, wherein said first operational amplifier has a high input impedance and a low offset in comparison to the difference between the logic levels of said digital input sequences.

5. A correlator as claimed in claim 1, wherein said shunt capacitor has a low self-discharge capacity.

6. A correlator as claimed in claim 1, wherein said divider divides said clock pulse signal frequency by 4.

7. A correlator as claimed in claim 1, wherein said low-pass filter consists of a filter resistor connected to the output of said digital multiplier stage and a grounded capacitor and wherein said tap is the node between said filter resistor and said grounded capacitor.

* * * * *